United States Patent
Burton et al.

(10) Patent No.: US 7,356,897 B2
(45) Date of Patent: Apr. 15, 2008

(54) SYSTEMS AND METHODS FOR VERIFYING A PRE-PROGRAMMED MATERIALS PROCESSING PATH

(75) Inventors: Kurt A. Burton, Wildwood, MO (US); Mike P. Matlack, St. Charles, MO (US); Raymond J. Slesinski, St. Louis, MO (US); John A. Baumann, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/127,327

(22) Filed: May 11, 2005

(65) Prior Publication Data

US 2006/0254038 A1    Nov. 16, 2006

(51) Int. Cl.
  *B23P 13/04*    (2006.01)
(52) U.S. Cl. .................. 29/56.5; 29/557; 409/231; 228/2.1
(58) Field of Classification Search ............... 29/56.5, 29/56.6, 57, 33 B, 33 K; 409/131, 132, 80, 409/97, 187, 194, 196, 197, 218, 135, 241, 409/85, 93, 231, 233, 125; 408/3, 6, 10, 408/11, 12, 13, 1 R; 228/112.1, 2.1
See application file for complete search history.

(56) References Cited

U.S. PATENT DOCUMENTS

| | | | |
|---|---|---|---|
| 4,304,512 A | | 12/1981 | Vierstraete |
| 4,778,313 A | * | 10/1988 | Lehmkuhl .................... 29/56.5 |
| 4,784,539 A | * | 11/1988 | Lehmkuhl ..................... 409/80 |
| 5,541,864 A | | 7/1996 | Van Bavel et al. |
| 5,566,188 A | | 10/1996 | Robbins et al. |
| 5,710,490 A | | 1/1998 | Choi |
| 5,895,160 A | * | 4/1999 | Ginelli ........................ 401/17 |
| 5,971,247 A | | 10/1999 | Gentry |
| 6,050,475 A | * | 4/2000 | Kinton et al. ............. 228/112.1 |
| 6,229,050 B1 | | 5/2001 | Nakano |
| 6,302,315 B1 | * | 10/2001 | Thompson ............... 228/112.1 |
| 6,341,244 B1 | | 1/2002 | Papiernik |
| 6,732,900 B2 | * | 5/2004 | Hansen et al. ............... 228/2.1 |
| 6,742,696 B2 | * | 6/2004 | Thompson ................... 228/2.1 |
| 6,774,598 B1 | | 8/2004 | Kohler et al. |
| 6,824,337 B2 | * | 11/2004 | Pentz et al. ................. 409/132 |
| 6,843,623 B2 | * | 1/2005 | Geissler ..................... 409/231 |
| 2002/0162876 A1 | | 11/2002 | Aota et al. |

FOREIGN PATENT DOCUMENTS

DE    3404555    8/1985
EP    0010043    4/1980

* cited by examiner

*Primary Examiner*—Dana Ross
(74) *Attorney, Agent, or Firm*—Lee & Hayes, PLLC

(57) ABSTRACT

Systems and methods for verifying a materials processing path on a work piece are described. In one embodiment, a system for verifying a material process path on a work piece includes a processing unit operable to receive processing instructions to control a motion of a machine tool device relative to a work piece. A tool holder of the machine tool device retains a tool path tracing assembly that applies a mark to a surface of the work piece as the assembly is moved along the material process path.

7 Claims, 4 Drawing Sheets

SYSTEMS AND METHODS FOR VERIFYING A PRE-PROGRAMMED MATERIALS PROCESSING PATH

FIELD OF THE INVENTION

This invention relates generally to materials processing, and, more particularly, to systems and methods for verifying a materials processing path on a work piece.

BACKGROUND OF THE INVENTION

Many material processing operations are presently performed using machine tools that operate under numerical control (NC). In a typical NC machine installation, a set of programmed instructions is processed by a machine tool unit (MTU) that provides motion control signals to servomechanisms coupled to the machine tool. A work piece retained by the machine tool is thus processed into a finished part according to the programmed instructions. The instructions are typically prepared by machine tool programmers who develop the instructions based upon available geometrical information for the finished part, which generally includes drawings of the part, either in paper or electronic form. The machine tool programmers also typically include process-related instructions, which may include feed rates for the work piece and even the selection of one or more forming tools such as drills, end mills, or other like forming devices that are driven by the NC machine.

In one particular application, the machine tool may be used to control a welding path in a friction stir welding (FSW) device. FSW is a process for joining metals that does not include the use of filler materials. Instead, a weld is developed along a pre-determined path through a combined action of frictional heating and mechanical deformation of the metal. Briefly, the FSW device rotates and impresses a FSW tool against a surface of the work piece that generates the required frictional heating and mechanical deformation. The FSW tool is progressively moved along a pre-determined path in conformity with the programmed instructions provided to the MTU.

The programmed instructions are generally encoded on a variety of transportable memory devices, which may include punched tapes, magnetic tapes or disks, or optical disks. The programmed instructions are then introduced to the MTU from the transportable memory device using a reader configured to read the transportable memory device. Occasionally, errors occur when the instructions are programmed that may result in one or more defects in the finished part. For example, incorrect geometrical information may be encoded in the instructions so that a part is produced having a weld path that departs from a desired weld path. Programming errors may also include process-related information, so that the work piece may, for example, be subjected to an incorrect feed rate during a portion of the welding process. In either instance, the work piece must be subjected to expensive rework procedures to salvage the part. Alternately, if the work piece cannot be salvaged, it must be entirely scrapped.

Accordingly, what is needed is a system and method for verifying a process path in an NC-controlled system that allows errors to be readily identified and corrected.

SUMMARY

The present invention comprises a system for and methods for verifying a materials processing path on a work piece. In one aspect, a system for verifying a material process path on a work piece includes a processing unit operable to receive processing instructions to control a motion of a machine tool device relative to a work piece. A tool holder of the machine tool device retains a tool path tracing assembly that applies a mark to a surface of the work piece as the assembly is moved along the material process path.

BRIEF DESCRIPTION OF THE DRAWINGS

Various embodiments of the present invention are described in detail below with reference to the following drawings.

DETAILED DESCRIPTION

The present invention relates to systems and methods for verifying a materials processing path on a work piece. Many specific details of certain embodiments of the invention are set forth in the following description and in FIG. 1 through FIG. 4 to provide a thorough understanding of such embodiments. One skilled in the art, however, will understand that the present invention may have additional embodiments, or that the present invention may be practiced without one or more of the details described in the following description and drawings.

Figure 1:
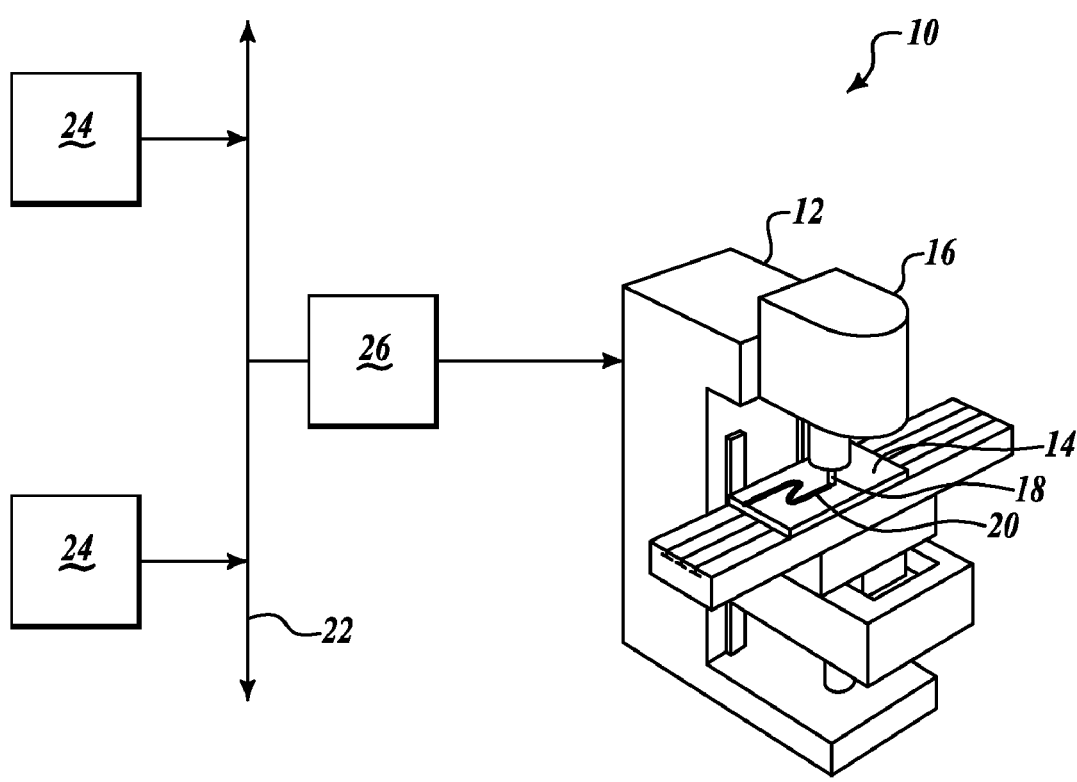
FIG. 1 is a is a diagrammatic representation of a system for verifying a process path according to an embodiment of the invention.

FIG. 1 is a diagrammatic representation of a system 10 for verifying a process path according to an embodiment of the invention. The system 10 includes a machine tool 12 operable to perform various material processing tasks on a work piece 14. Accordingly, the machine tool 12 may include three, four and five axis machines known in the art, which may perform machining, cutting or welding processes on the work piece 14. In the present embodiment, the machine tool 12 is configured to perform a friction stir welding (FSW) process on the work piece 14. Accordingly, a tool head 16 coupled to the machine tool 12 is configured to support a FSW tool (not shown in FIG. 1). As will be discussed in greater detail below, the tool head 16 may be further configured to removably support a tool path tracing assembly 18 that visually marks the work piece 14 along a predetermined process path 20. The tool path tracing assembly 18 will be discussed in greater detail below.

The system 10 also includes a communications network 22 that permits information to be communicated from one or more processing units 24 to a machine tool unit (MTU) 22. The communications network 22 may include a telephone communications system, a digital subscriber line (DSL), an integrated services digital network (ISDN), a coaxial-based system using a cable modem, or other suitable systems. In other embodiments, the communications network 22 may be a wireless communications system, such as a local area network (LAN), an Ethernet system, or other suitable wireless communications systems.

The processor 24 may generally be operable to receive programmed instructions and data, and to process the data according the received instructions. In particular, however, the processor 24 may be configured to process design information retained by the processor 24 and to generate "high-level" machine tool instructions that describe the location of features on the work piece 14. The high-level machine tool instructions are then communicated to a machine tool unit (MTU) 26 through the communications network 22. The MTU 26 may be operable to control the motions of the machine tool 12 so that the work piece 14 may be subjected to the desired processing operations. In FIG. 1, a single MTU 26 is coupled to the one or more processors 24 through the communications network 22, as is commonly encountered in a computer numerical control (CNC) system. It is understood, however, that other arrangements are possible. For example, a plurality of MTU's and machine tools may operate under the centralized control of the one or more processors 24, as is commonly found in a distributed numerical control (DNC) system.

Figure 2:
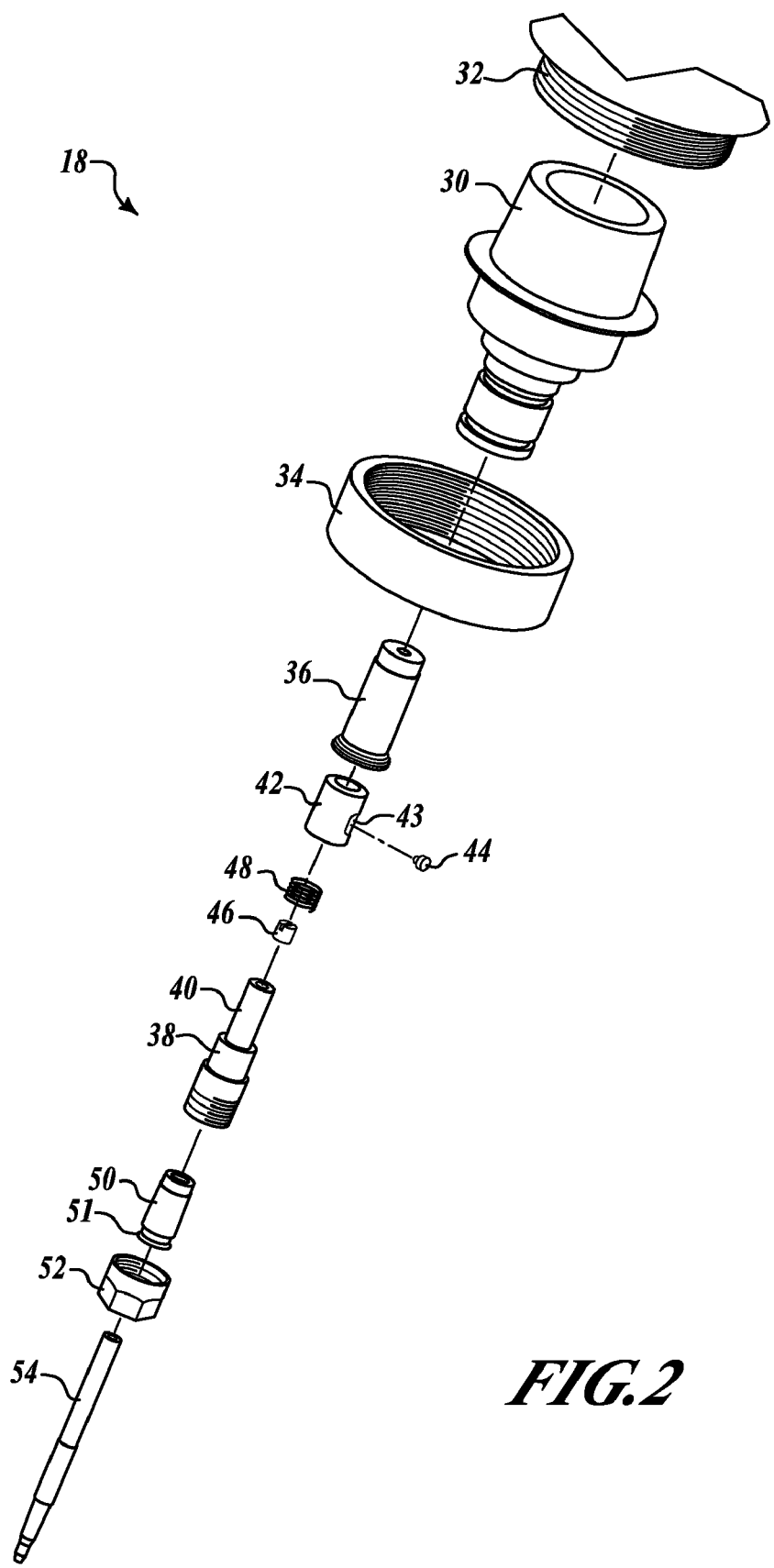
FIG. 2 is an exploded, isometric view of the tool path tracing assembly 18 of FIG. 1, according to another embodiment of the invention.

FIG. 2 is an exploded, isometric view of the tool path tracing assembly 18 of FIG. 1, according to another embodiment of the invention. The tool path tracing assembly 18 includes a tool holder 30 that is configured to be slidably received by an FSW spindle 32 that is coupled to the tool head 16 of the machine tool 12 (FIG. 1). The tool holder 30 is retained within the FSW spindle 32 by a spindle nut 34 that threadably couples to the FSW spindle 32. A tool path tracing collet 36 is suitably sized and is removably received within a corresponding recess of the tool holder 30 (not shown in FIG. 2).

In this embodiment, a tool path tracing collet shaft 38 includes an upper shaft portion 40 that is suitably sized to slidably receive a guide shaft 42. The guide shaft 42 includes a groove 43 that extends longitudinally along at least a portion of a length of the guide shaft 42, and is configured to receive a guide pin 44 that retains the guide shaft 42 in a desired range of positions on the upper shaft portion 40. The upper shaft portion 40 also includes an internal bore (not shown in FIG. 2) that threadably receives a setscrew 46. A spring 48 is interposed between the guide shaft 42 and the tool path tracing collet shaft 38 to springably bias the collet shaft 38 away from the guide shaft 42.

As further shown in FIG. 2, a stylus collet 50 is suitably sized to be positioned within a recess (not shown) of the tool path tracing collet shaft 38. The stylus collet 50 is suitably tapered and includes longitudinally-extending relief cuts 51 that permit an interior recess (not shown) to decrease in diameter as the stylus collet 50 is urged into the recess of the tool path tracing collet shaft 38. A stylus collet nut 52 is threadably received by the tool path tracing collet shaft 38 so that the stylus collet 50 is urged into the recess within tool path tracing collet shaft 38. A stylus 54 is thus fixedly retained within the recess when the stylus collet nut 52 is progressively threaded onto the tool path tracing collet shaft 38 so that the recess within the stylus collet 50 circumferentially presses against the stylus 54. The stylus 54 may be any device suited to make a visible mark on the work piece 14. For example, in one embodiment, the stylus 54 may be a pen having a felt or fiber-based tip that draws an ink from a reservoir positioned within the stylus 54 by capillary action. Alternately, in another embodiment, the stylus 54 may be a device that is pressure-fed, such as a pressure-fed pen, or even an ink-jet print head. In other particular embodiments, the stylus 54 may include a scribing device that is operable to non-removably scribe a mark onto a surface of the work piece 14.

Figure 3:
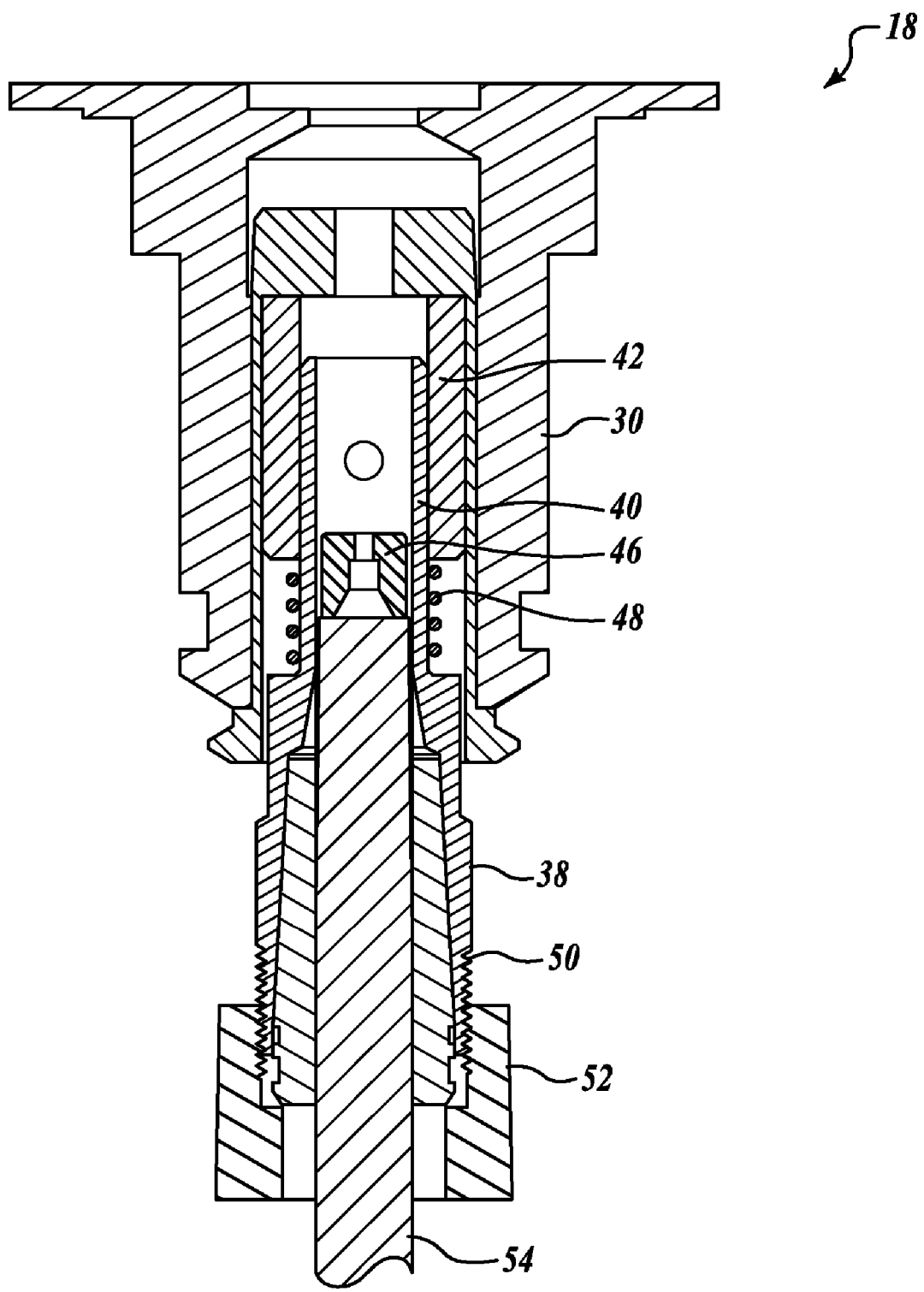
FIG. 3 is a partial cross-sectional view of the tool path tracing assembly of FIG. 1 and FIG. 2.

FIG. 3 is a partial cross-sectional view of the tool path tracing assembly 18 of FIG. 1 and FIG. 2, which will be used to describe the assembly 18 in greater detail. The guide shaft 42 and the tool path tracing collet shaft 38 are received into the tool holder 30, as described in detail above. The upper shaft portion 40 may move relative to the guide shaft 42 so that the spring 48 may bias the stylus 54 towards a surface of the work piece. The setscrew 46 may be adjustably positioned within the upper shaft portion 40 to position the stylus 54 at a desired depth in the stylus collet 50.

Figure 4:
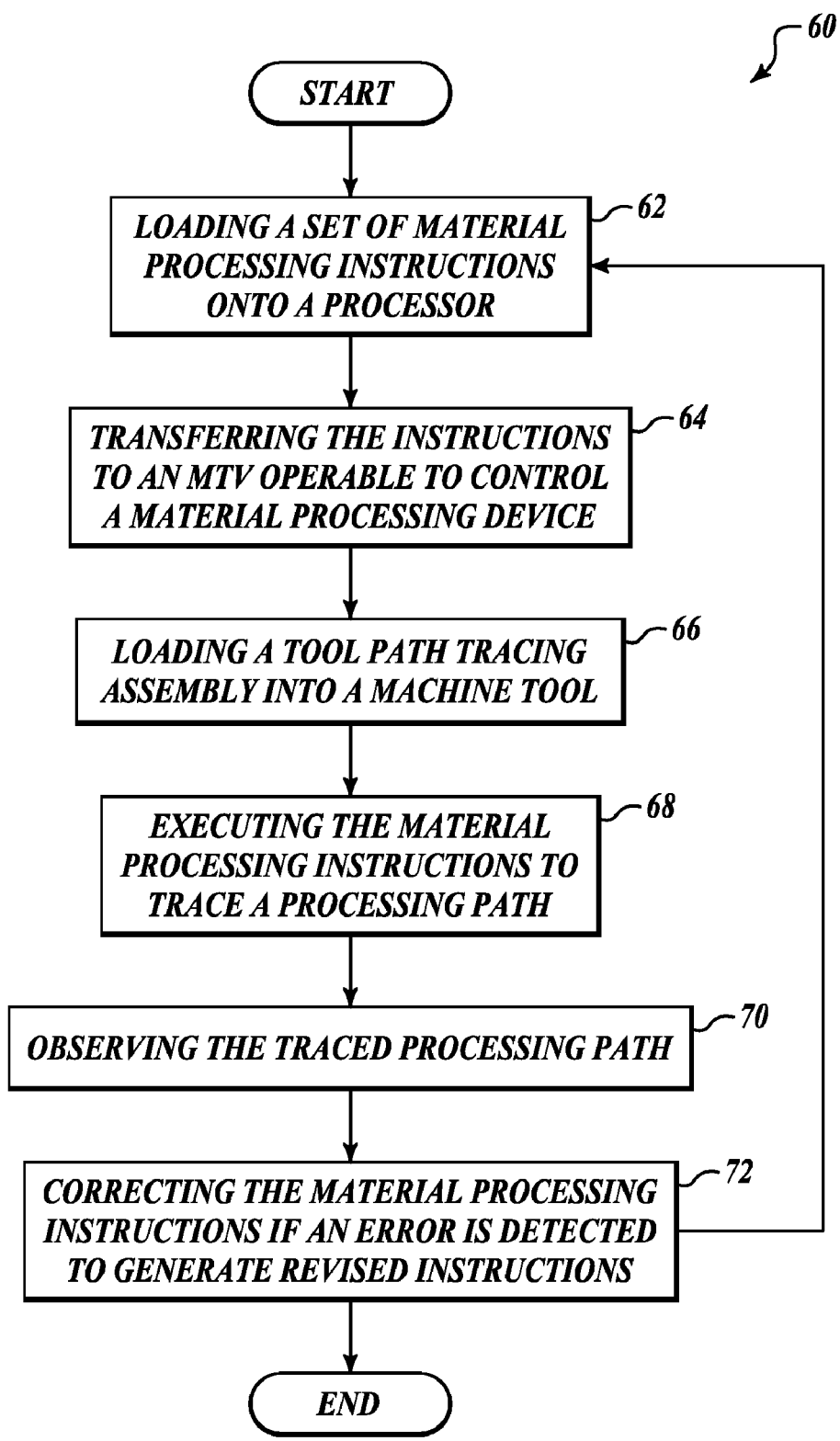
FIG. 4 is a flow chart that describes a method of verifying a pre-programmed materials processing path, according to another embodiment of the invention.

FIG. 4 is a flow chart that describes a method 60 of verifying a pre-programmed materials processing path, according to another embodiment of the invention. At block 62, a set of material processing instructions is loaded into a processor, such as the processor 24 of FIG. 1. At block 64, the instructions are transferred to an MTU that is operable to control a machine tool, as described, for example, in connection with FIG. 1. The instructions may be communicated to the MTU using a communications system that couples the processor to the MTU. At block 66, a tool path tracing assembly is installed in a tool holder of a machine tool. As described in greater detail above, and in one particular embodiment, the tool path tracing assembly may be installed in a tool holder that is configured to accommodate a friction stir welding (FSW) device. At block 68, the processing instructions are executed in the MTU to control the motion of the machine tool. The stylus retained within the tool path tracing assembly thus moves along a path on the work piece and marks the path on surfaces of the work piece.

At block 70, the traced process path is observed on the work piece to determine if the traced process path conforms to the desired process path. For example, if the process path is a FSW path, and it is observed that the traced path departs from the desired FSW path, the one or more locations of the departure may be noted, so that the instructions may be altered. At block 72, the errors in the material processing instructions that generated the departures from the desired process path are corrected, so that revised processing instructions are generated. Block 72 may recursively return to block 62 in order to examine the revised processing instructions for further errors. Alternately, the method 60 ends at block 72 if, for example, no errors are detected or if some other condition suitable is met.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. An apparatus for tracing a material process path on a work piece, comprising:

a tool holder configured to be received by a tool head of a machine tool;

a tool path tracing assembly configured to be received by the tool holder, the tool path tracing assembly having a guide shaft, the guide shaft having a laterally positioned aperture configured to receive a pin, the pin adjustably retaining the guide shaft between a first position and a second position on an upper shaft portion of a collet shaft, the collet shaft to receive a collet shaft component; and a marking stylus configured to be received by the tracing assembly, the marking stylus comprising at least one of a felt or fiber-based tip, a pressure-fed pen, and an ink-jet print head, the marking stylus configured to non-removably scribe a mark onto the work piece surface when the marking stylus is positioned against the work piece surface to mark the process path as the tracing assembly is moved along the work piece surface.

2. The apparatus of claim 1, wherein the tool holder is further configured to be received in a friction spin welding (FSW) spindle positioned on the tool head.

3. The apparatus of claim 1, wherein the collet shaft component is configured to removably retain the stylus.

4. The apparatus of claim 1, wherein the tool path tracing assembly further comprises a spring to bias the stylus towards the surface of the work piece.

5. The apparatus of claim 1, wherein the material process path further comprises a friction spin welding (FSW) process path.

6. The apparatus of claim 1, wherein the material process path comprises a material cutting path.

7. An apparatus for tracing a material process path on a work piece, comprising:
   a tool holder configured to be received by a tool head of a machine tool;
   a tool path tracing assembly configured to be received by the tool holder, the tool path tracing assembly having a guide shaft, the guide shaft having a laterally positioned aperture configured to receive a pin, the pin adjustably retaining the guide shaft between a first position and a second position on an upper shaft portion of a collet shaft, the collet shaft to receive a collet shaft component; and
   a marking stylus configured to be received by the collet shaft component.

* * * * *